US009755286B2

(12) United States Patent
Wang et al.

(10) Patent No.: US 9,755,286 B2
(45) Date of Patent: Sep. 5, 2017

(54) SYSTEM AND METHOD FOR VARIABLE MICROWAVE PHASE SHIFTER

(71) Applicants: Kuangda Wang, Montreal (CA); Haiyan Jin, Chengdu (CN); Ke Wu, Montreal (CA); Tarek Djerafi, Montreal (CA)

(72) Inventors: Kuangda Wang, Montreal (CA); Haiyan Jin, Chengdu (CN); Ke Wu, Montreal (CA); Tarek Djerafi, Montreal (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 69 days.

(21) Appl. No.: 14/562,158

(22) Filed: Dec. 5, 2014

(65) Prior Publication Data
US 2016/0164155 A1 Jun. 9, 2016

(51) Int. Cl.
*H01P 9/00* (2006.01)
*H01P 1/18* (2006.01)
(Continued)

(52) U.S. Cl.
CPC .............. *H01P 1/182* (2013.01); *C04B 35/10* (2013.01); *H01P 11/007* (2013.01); *H01Q 3/36* (2013.01)

(58) Field of Classification Search
CPC ........ H01P 1/181; H01P 1/182; H01P 11/007; H01Q 3/36
(Continued)

(56) References Cited

U.S. PATENT DOCUMENTS

| 4,796,979 A | * | 1/1989 | Tsuboyama | ....... G02F 1/133711 |
| | | | | 349/129 |
| 5,186,986 A | * | 2/1993 | Ogawa | ................... B05D 1/185 |
| | | | | 349/123 |

(Continued)

FOREIGN PATENT DOCUMENTS

CN 101364656 2/2009
DE 2768072 A1 * 8/2014 .............. H01P 1/181

(Continued)

OTHER PUBLICATIONS

Hage-Ali et al., "A Millimeter-Wave Elastomeric Microstrip Phase Shifter," Microwave Symposium Digest (MTT), 2012 IEEE MTT-S International, Jun. 17-22, 2012, pp. 1-3.

(Continued)

*Primary Examiner* — Robert Pascal
*Assistant Examiner* — Kimberly Glenn
(74) *Attorney, Agent, or Firm* — Gowling WLG (Canada) LLP

(57) ABSTRACT

A phase shifter and a method of making a phase shifter are disclosed herein. The phase shifter may include a housing, a dielectric, an electrode, and a liquid crystal layer. The housing includes first, second, third, and fourth conductive walls, each conductive wall being opposite one of the other walls. The dielectric is situated within the housing and defines a compartment within the housing. The electrode is aligned with the compartment. The liquid crystal layer fills the space of the compartment. A bias line is coupled to the electrode. The phase shifter may be integrated with as substrate integrated waveguide.

19 Claims, 16 Drawing Sheets

(51) Int. Cl.
  *H01P 11/00* (2006.01)
  *C04B 35/10* (2006.01)
  *H01Q 3/36* (2006.01)
(58) Field of Classification Search
  USPC .............. 333/138, 140, 156–158, 161, 164
  See application file for complete search history.

(56) References Cited

U.S. PATENT DOCUMENTS

| | | | | |
|---|---|---|---|---|
| 5,355,104 | A * | 10/1994 | Wolfson | H01P 1/181 333/139 |
| 5,537,242 | A * | 7/1996 | Lim | H03C 7/02 250/201.9 |
| 5,539,547 | A * | 7/1996 | Ishii | G02F 1/13476 349/74 |
| 5,936,484 | A * | 8/1999 | Dolfi | H01P 1/181 333/156 |
| 6,043,860 | A * | 3/2000 | Wei | G02F 1/1393 349/187 |
| 7,929,067 | B2 * | 4/2011 | Irie | C09K 19/02 349/21 |
| 2001/0017577 | A1 * | 8/2001 | Toko | H01P 1/181 333/161 |
| 2014/0022029 | A1 * | 1/2014 | Glushchenko | H01P 1/18 333/161 |
| 2014/0077894 | A1 * | 3/2014 | Bulja | H01P 1/18 333/119 |

FOREIGN PATENT DOCUMENTS

| | | | |
|---|---|---|---|
| FR | 2500977 A1 * | 9/2012 | ............... H01P 1/18 |
| JP | 2001237606 | 8/2001 | |
| JP | 2003298306 | 10/2003 | |
| JP | 2004104382 | 4/2004 | |

OTHER PUBLICATIONS

Chiang et al., "A 60GHz Digitally Controlled 4-bit Phase Shifter with 6-ps Group Delay Deviation," Microwave Symposium Digest (MTT), 2012 IEEE MTT-S International , Jun. 17-22, 2012, pp. 1-3.
Meng et al., "Miniaturized 3-bit Phase Shifter for 60 GHz Phased-Array in 65 nm CMOS Technology," IEEE Microwave and Wireless Components Letters, Jan. 2014, vol. 24, No. 1, pp. 50-52.
Li et al., "60-GHz 5-bit Phase Shifter With Integrated VGA Phase-Error Compensation," IEEE Transactions on Microwave Theory and Techniques, Mar. 2013, vol. 61, No. 3, pp. 1224-1235.
Woods et al., "CMOS Millimeter Wave Phase Shifter Based on Tunable Transmission Lines," Custom Integrated Circuits Conference (CICC), 2013 IEEE, Sep. 22-25, 2013, pp. 1-4.
Chang et al., "A V-Band Three-State Phase Shifter in CMOS-MEMS Technology," IEEE Microwave and Wireless Components Letters, May 2013, vol. 23, No. 5, pp. 264-266.
Biglarbegian et al., "MEMS-based Reflective-Type Phase-Shifter for Emerging Millimeter-wave Communication Systems," Microwave Conference (EuMC), 2010 European, Sep. 28-30, 2010, pp. 1556-1559.
Kim et al., "V-band 2-b and 4-b Low-Loss and Low-Voltage Distributed MEMS Digital Phase Shifter Using Metal-Air Metal Capacitors," IEEE Transactions on Microwave Theory and Techniques, Dec. 2002, vol. 50, No. 12, pp. 2918-2923.
Franc et al., "Compact and Broadband Millimeter-Wave Electrically Tunable Phase Shifter Combining Slow-Wave Effect With Liquid Crystal Technology," IEEE Transaction on Microwave Theory and Techniques, Nov. 2013, vol. 61, No. 11, pp. 3905-3915.
Fritzsch et al., "Advanced characterization of a W-band phase shifter based on liquid crystals and MEMS technology", International Journal of Microwave and Wireless Technologies, Jun. 2012, vol. 4, No. 3, pp. 379-386.
Gaebler et al., "Investigation of High Performance Transmission Line Phase Shifters Based on Liquid Crystal," Microwave Conference, Proceedings of the 39th European Microwave Conference, Sep. 29, 2009-Oct. 1, 2009, pp. 594-597.
Bulja et al., "Measurement of Dielectric Properties of Nematic Liquid Crystals at Millimeter Wavelength," IEEE Transaction on Microwave Theory and Techniques, Dec. 2010, vol. 58, No. 12, pp. 3493-3501.
Manabe, "Liquid Crystals for Microwave Applications", Antennas and Propagation (EuCAP), Apr. 8-12, 2013, pp. 1793-1794.
International Search Report and Written Opinion for corresponding PCT appl. No. PCT/CN2015/096168; Feb. 3, 2016.
English Abstract and partial english translation of cited reference JP2004104382A.
English Abstract and partial english translation of cited reference JP2003298306A.
English Abstract of cited reference JP2001237606A.
English Abstract of cited reference CN101364656A.

* cited by examiner

SYSTEM AND METHOD FOR VARIABLE MICROWAVE PHASE SHIFTER

FIELD

The present disclosure relates generally to phase shifters.

BACKGROUND

Phase shifters are used in microwave systems such as phased array systems. Phase shifters are used to provide a controllable phase shift of a microwave signal and can be constructed using various technologies. Some commercially available phase shifters include active components such as transistors and diodes and may be based on micro-electromechanical systems (MEMS). Phase shifters can be used in a variety of technology areas such as, for example, telecommunications and radar systems.

Improvements in phase shifters are desirable. For example, it is generally desirable for phase shifters to have relatively low power requirements, exhibit relatively low losses during operation, and have relatively low fabrication costs.

SUMMARY

In a first aspect, the present disclosure provides an apparatus that includes a housing, a dielectric, an electrode, and a liquid crystal layer. The housing includes first, second, third, and fourth conductive walls, each conductive wall being opposite one of the other walls. The dielectric is situated within the housing and defines a compartment within the housing. The electrode is aligned with an inside surface of the compartment. The liquid crystal (LC) layer fills the space of the compartment. A bias line is coupled to the electrode.

The electrode may form at least a portion of a surface of the compartment.

The apparatus may further include a waveguide portion and a phase shifter portion. The waveguide portion corresponds to the portion of the apparatus where the dielectric fills the entire volume between the conductive walls. The phase shifter portion corresponds to the portion of the apparatus that includes the compartment.

The apparatus may further include an opening in one of the conductive walls and the bias line passes through the opening.

The electrode may comprise a plurality of sections where each of the sections are spaced apart from adjacent sections. The electrode may further include links that electrically connect each of the plurality of sections to an adjacent section.

The housing may be shaped as a rectangular prism.

At least one alignment chemical coating may be applied on at least one surface of the compartment. The at least one alignment chemical coating may be selected to, in the absence of an applied static electric field, align molecules in an orientation that is parallel to a plane of the electrode.

In another aspect, a method of fabricating a microwave apparatus. The method providing a bottom metal layer, providing a first dielectric layer on top of the first metal layer, providing an electrode on the first dielectric layer where the first electrode is situated on a surface of the dielectric layer opposite the first metal layer. The method also includes providing a second dielectric layer and creating a compartment in the second dielectric layer. The compartment has a dimension corresponding to the electrode. The method further includes attaching the second dielectric layer to the first dielectric layer in a position that aligns the compartment with the electrode, filling the compartment with a liquid crystal (LC) layer, and providing a top metal layer on top of the second dielectric layer. The method also includes creating vias through the top metal layer, second dielectric layer, and first dielectric layer. The method also includes metallizing the vias to provide an electrical connection between the top metal layer and the bottom metal layer.

Providing the bottom metal layer and providing the first dielectric may comprise providing a first laminate layer, where the first laminate layer is a printed circuit board laminate that has a substrate layer, a top metal layer, and a bottom metal layer.

Providing the electrode may include etching the top metal layer of the first layer to form the electrode.

Providing the second dielectric layer may include providing a second laminate layer and removing the top and bottom metal layers from the second laminate.

Creating the compartment may include creating a hole in the second dielectric and attaching the second dielectric to the first dielectric.

The method may further include applying at least one alignment chemical coating to at least one surface of the apparatus in contact with the LC layer. The at least one alignment chemical coating may be selected to, in the absence of an applied static electric field, align molecules of the LC layer in an orientation that is parallel to a plane of the electrode.

The electrode may comprise a plurality of sections where each of the sections are spaced apart from adjacent sections. The electrode may further include links that electrically connect each of the plurality of sections to an adjacent section.

The method may include creating at least two vias on one side of the apparatus, where the at least two vias have a space therebetween. The method may also include generating a bias line that is coupled to the electrode and that extends through the space between the vias.

Providing the second dielectric layer may include providing a second laminate layer and removing the bottom metal layer from the second laminate. Creating the compartment may also include creating a hole through the top metal layer of the second laminate. The method may further include providing a third laminate layer and attaching the third laminate to the second laminate. In some embodiments, metallizing the vias may be performed before the compartment is filled with a liquid crystal layer.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Various embodiments disclosed herein relate to variable microwave phase shifters that incorporate a liquid crystal layer. The term "microwave", as used herein, refers to an electromagnetic wave that includes, but is not limited to, a frequency component in the range of 1 kHz to 1000 GHz. Various embodiments of the phase shifters described herein may be incorporated with a substrate integrated waveguide.

Figure 1A:
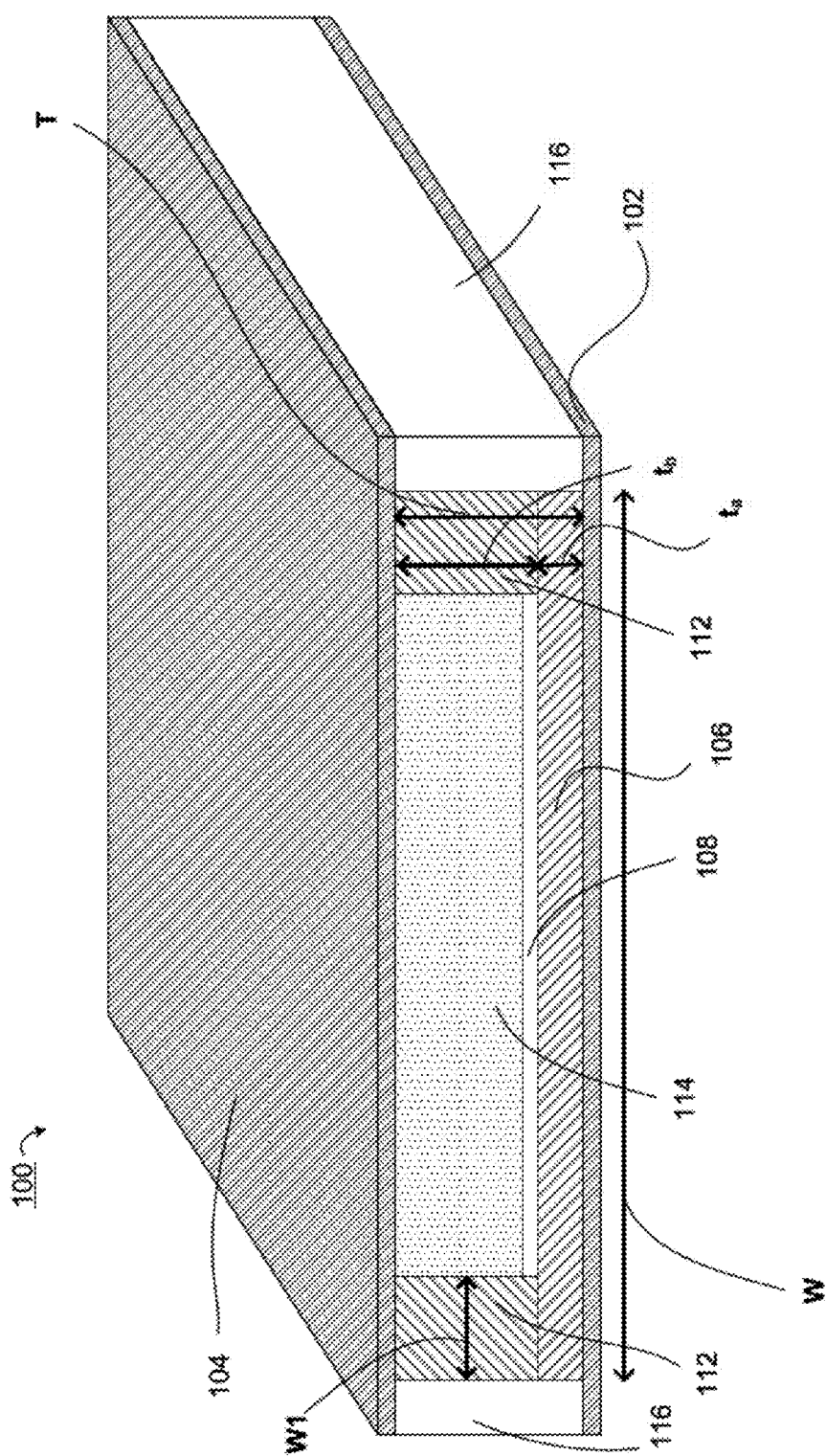
FIG. 1A is a perspective view of an example phase shifter, in accordance with an embodiment of the present disclosure.

Reference is first made to FIG. 1A, which illustrates a perspective view of a variable phase shifter 100, in accordance with an embodiment of the present disclosure. Phase shifter 100 includes a variety of components which will now be briefly described. Bottom ground plane 102 and top ground plane 104 are conductive layers. Accordingly, in an embodiment, bottom ground plane 102 and top ground plane 104 correspond to top and bottom metal layers of phase shifter 100. In various embodiments, suitable materials for ground planes 102 and 104 include, but are not limited to, copper, gold, silver, and alloys thereof.

In an embodiment, dielectric layer 106 comprises a supporting substrate. In various embodiments, dielectric layer 106 can comprise any suitable dielectric material, which can include, but is not limited to, polytetrafluoroethylene (PTFE), ceramic, glass, $SiO_2$, appropriately-doped or undoped GaAs, and combinations thereof.

Electrode 108 is a conductive layer and in various embodiments can comprise, but is not limited to, copper, gold, silver, and alloys thereof. In an embodiment, electrode 108 spans an inside surface of dielectric 106 between either side of dielectric 112. In some embodiments, electrode 108 is larger and can extend beyond the walls of dielectric 112. In some embodiments, electrode 108 extends between dielectrics 106 and 112. In various embodiments, dielectric layer 112 can comprise any suitable material, which can include, but is not limited to, polytetrafluoroethylene (PTFE), ceramic, glass, $SiO_2$, GaAs and combinations thereof. In some embodiments, dielectrics 106 and 112 can be comprised of the same material. In other embodiments, dielectrics 106 and 112 are comprised of different materials. Dielectrics 106 and 112 are illustrated as separate layers. In an embodiment, dielectric layers 106 and 112 can be a single structure. In some embodiments, dielectrics 106 and 112 may be referred to as substrate layers and may comprise, for example, a printed circuit board (PCB) substrate. In various embodiments, dielectrics 106 and 112 are composed of the same material. In other embodiments, dielectrics 106 and 112 are composed of different materials. Commercially available products that may be used for dielectrics 106 and 112, in conjunction with PCB manufacturing processes for example, are discussed below.

Dielectrics 106 and 112, along with top ground plane 104, define a compartment or container. LC (Liquid Crystal) layer 114 fills the space of the compartment. In various embodiments, electrode 108 is aligned with the compartment. In some embodiments, this is achieved by having at least a portion of the electrode span an entire surface the compartment. In some embodiments, electrode 108 forms an inside surface of the compartment. In other embodiments, electrode 108 is situated on an inside surface of the compartment. In yet other embodiments, electrode 108 is outside of the compartment and is not in physical contact with LC layer 114. In various embodiments, LC layer 114 can comprise, but is not limited to, twisted nematic LCs, super-twisted nematic LCs and chiral nematic LCs. The nematic phase is one of the most common phases of liquid crystals and is generally used for tunable electronic devices because the phase generally has attractive properties, such as large tuning ranges and low losses. However, it should be understood that while some embodiments disclosed herein utilize nematic LCs, other embodiments can also utilize other phases of LCs. Accordingly, various embodiments herein utilize single liquid crystal compounds or liquid crystal mixtures that comprises two or more single liquid crystal compounds. In yet other embodiments, other liquid crystal compounds can also be utilized.

In an embodiment, sidewalls 116 each span between ground plane 102 and 104. Sidewalls 116 are comprised of a conductive material, which can be the same as the material used for ground planes 102 and 104. Accordingly, in various embodiments, suitable materials for sidewalls 116 include, but are not limited to, copper, gold, silver, and alloys thereof. In an embodiment, sidewalls 116 need not be continuous along the length of phase shifter 100. For example, in some such embodiments, sidewalls 116 may comprise sections of conductive material that appear in a repetitive pattern along the length of the phase shifter.

In some such embodiments, the spaces between the sections of sidewalls 116 may be filled with a dielectric, such as dielectric 106 and 112.

Although not illustrated in FIG. 1A, phase shifter 100 also includes a bias line coupled to electrode 108, which allows for a bias voltage to be applied to electrode 108. The bias line is discussed in greater detail below in relation to FIG. 12.

As can be seen from FIG. 1A, in an embodiment, phase shifter 100 can be considered to include a housing. The housing includes four conductive walls, which correspond to top ground plane 104, bottom ground plane 102, and sidewalls 116. Each conductive wall is opposite another one of the conductive walls. In an embodiment, the phase shifter is shaped like a rectangular prism with each metal wall corresponding to one of four faces of the rectangular prism.

In an embodiment, LC layer 114 includes molecules that are anisotropic and can be represented by vectors. When certain conditions are applied to a LC bulk, the majority of molecules of the LC bulk will take on the same orientation. In an embodiment, the LC molecules generally have a rod-like shape and the orientation refers to the longitudinal direction of the rod shape. When the majority of molecules of the LC bulk are oriented in the same direction, the lowest permittivity $\epsilon_{low}$ can be found in a direction perpendicular to the vector representing the molecules and the highest permittivity $\epsilon_{high}$ can be found in the direction parallel to the vector.

In certain embodiments, the inner surfaces of dielectric 112, the top side of electrode 108 and the bottom side of 104 that are in contact with the LC layer 114 may be coated with thin layers of chemicals for the alignment of the LC molecules within LC layer 114. These chemicals will be referred to herein as alignment chemicals. In an embodiment, the alignment chemicals can include, but are not limited to, polyimides. Due to the surface anchoring effect, some alignment chemicals will orient the vector of the LC molecules in a direction that is parallel to the coated surface, while some other chemicals will orient the vector of the LC molecules in a direction that is perpendicular to the surface. In various embodiments, such surface treatments or coatings can be used to achieve particular initial permittivity values of the LC bulk that makes up LC layer 114.

In various embodiments of the phase shifters disclosed herein, when no bias voltage is applied between electrode 108 and ground plane 104, the LC molecules of LC layer 114 are in an initial state in which a substantial portion of the molecules are generally oriented in directions that are perpendicular an electric field of a signal passing through LC layer 114. In an embodiment, this corresponds to the molecules having orientations that are parallel to the plane of electrode 108. In some such embodiments, surface coatings, which may include alignment chemicals, are applied to the top surface of electrode 108 and the bottom side of ground plane 104 (i.e. the surfaces of electrode 108 and of ground plane 104 that are in contact with the LC layer) in order to orient the vector of the LC molecules in LC layer 114 in directions that are parallel to the coated surface and perpendicular to the electric field of a microwave signal passing though LC layer 114. In such embodiments, due to the surface anchoring effect as well the surface coatings, in the initial state (i.e. without a bias applied to the electrode), the LC molecules have nearly the same orientation along the surface of the electrode 108 and top ground plane 104. In addition, in such embodiments, the inner surfaces of dielectric 112 can be coated with alignment chemicals that orient the vector of the LC molecules in LC layer 114 in directions that are perpendicular to both the coated surface and the electric field of a microwave signal passing though LC layer 114. Consequently, when such embodiments of phase shifter 100 are in use, such as when it is coupled to or integrated with a waveguide, and a microwave signal is propagated into it while no bias is applied to the electrode, the transverse electric (TE) mode with the lowest cutoff frequency (TE10mode) of the microwave signal passing through the LC layer 114 encounters a LC layer 114 having molecule orientations that are mostly perpendicular to the field direction. This results in an effective permittivity of the LC layer 114 that is close to $\epsilon_{low}$.

Figure 1B:
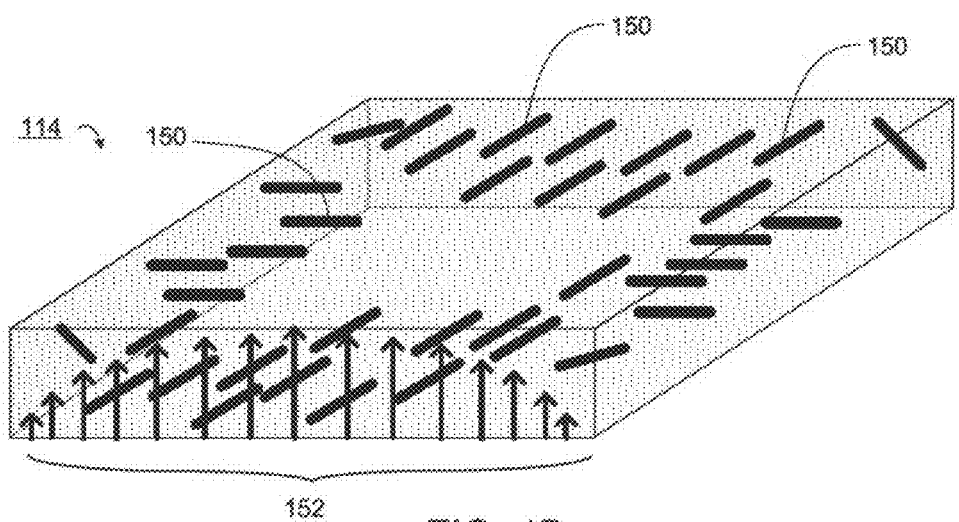
FIG. 1B illustrates a perspective view of the dielectric layer of FIG. 1A in a first state, in accordance with an embodiment of the present disclosure.

FIG. 1B is a perspective view of LC layer 114 of phase shifter 100, in a first state, which corresponds to an absence of a static electric field. In other words, FIG. 1B corresponds to the situation where no bias voltage is applied to electrode 108. The remaining elements of phase shifter 100 are omitted from FIG. 1B for clarity. As can be seen, when suitable coating chemicals are utilized, the LC molecules 150 can have various orientations. However, they are generally oriented in directions that are perpendicular to the electric field 152 of a microwave signal passing through the LC layer 114. In an embodiment, this corresponds to LC molecules 150 being oriented parallel to the plane of electrode 108. Electric field 152 of FIG. 1B illustrates the TE10 mode of a microwave signals.

When a bias voltage of a sufficiently high value is applied between electrode 108 and ground plane 104, then the majority of the LC molecules of LC layer 114 are rotated along the direction of the static electric field established by the bias voltage. Accordingly, under such bias conditions, the TE10 mode of the microwave signal passing through LC layer 114 encounters a LC bulk having molecule orientations that are mostly aligned with the electric field of the TE10 mode and therefore the effective permittivity of LC layer 114 is close to $\epsilon_{high}$. With other intermediate bias voltages, the effective permittivity is between the two values ($\epsilon_{low}$ and $\epsilon_{high}$) and increases as the bias voltage is increased.

Figure 1C:
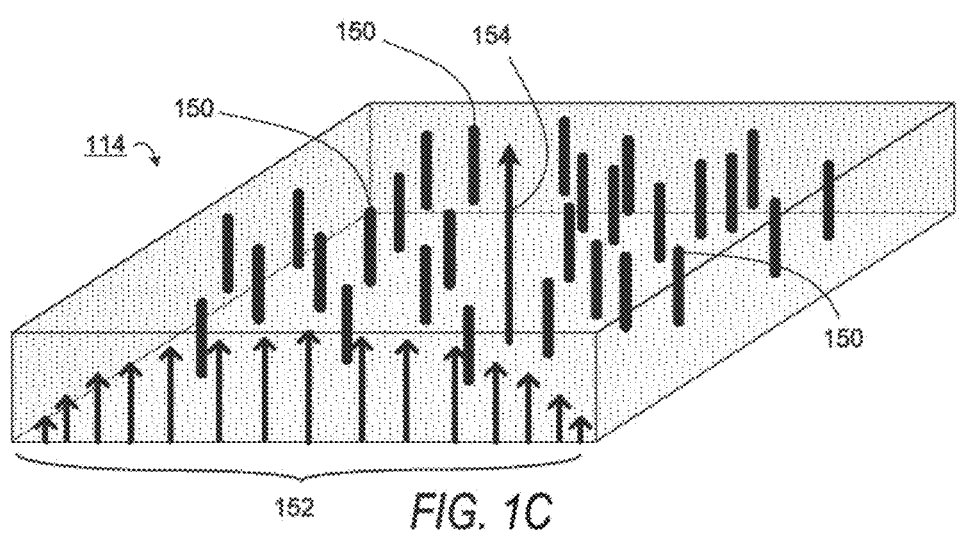
FIG. 1C illustrates a perspective view of the dielectric layer of FIG. 1A in a second state, in accordance with an embodiment of the present disclosure.

FIG. 1C is a perspective view of LC layer 114 of phase shifter 100, in a second state, which corresponds to the presence of a static electric field. In other words, FIG. 1C corresponds to the situation where a bias voltage is applied to electrode 108. Arrow 154 represents the direction of the static electric field. The remaining elements of phase shifter 100 are omitted from FIG. 1C for clarity. As can be seen, when a static electric field is applied between electrode 108 and top ground plane 104, LC molecules 150 take on an orientation that is the direction of static electric field. Accordingly, under such conditions, molecules 150 are generally aligned with the electric field 152 of the microwave signal.

Figure 1D:
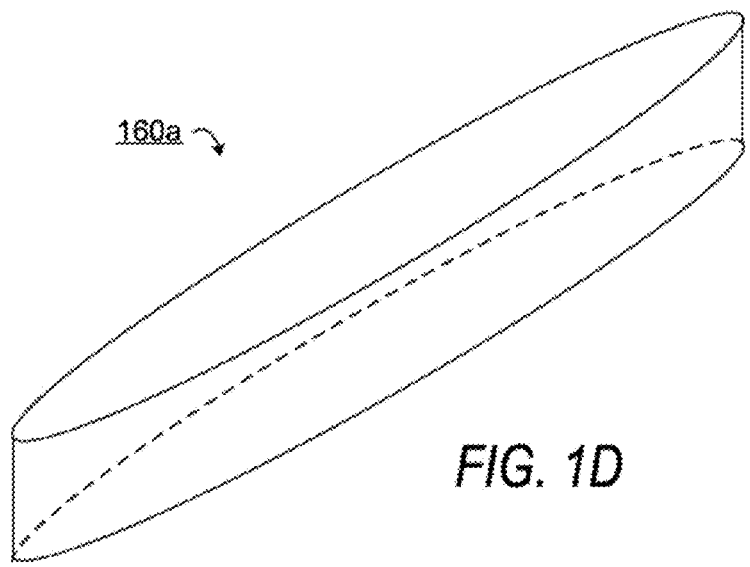
FIGS. 1D and 1E illustrate alternative shapes for an LC compartment, in accordance with embodiments of the present disclosure.
Figure 1E:
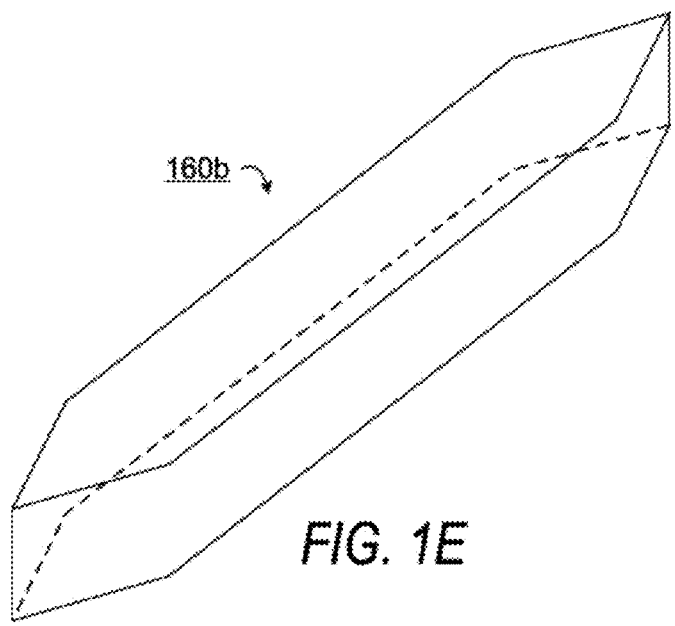

Although the compartment that holds LC layer 114 is shown has having a shape generally corresponding to a rectangular prism, other shapes may be used. FIG. 1D illustrates an alternative shape 160a for the LC compartment. FIG. 1E illustrates another alternative shape 160b for the LC compartment. These are examples only. Other embodiments may use other shapes for the LC compartment.

In contrast to the static electric field corresponding to the bias voltage applied between electrode 108 and ground plane 104, the electric field of the microwave signal does not impact the orientation of the LC molecules of LC layer 114 because the direction of the electric field of the microwave signal changes too quickly for the LC molecules to follow.

As mentioned above, with the use of suitable surface coatings, the surface anchoring effect establishes a low initial permittivity state of LC layer 114. In some embodiments, this can be used to achieve a larger phase tuning range of phase shifter 100 than would be otherwise achieved without the coating. Examples of coating chemicals that will orient the vector of LC molecules in a direction that is parallel to the coated surface include, but are not limited, to SE-150 and SE-3310 from Nissan Chemical Industries, Japan as well as AL3046 and AL23201 from JSR Corporation, Japan. Examples of coating chemicals that will orient the vector of LC molecules in a direction that is perpendicular to the coated surface include, but are not limited to, SE-1211 and SE-5300 from Nissan Chemical Industries, Japan as well as AL63702 from JSR Corporation, Japan.

Examples of commercial LC materials or LC mixtures that can be used for LC layer 114 in various embodiments include, but are not limited to E7, E44, E48, E31, E63, E80, and BL003, BL006, BL033, BL037, BL048, BL087, BL101, BL112, BL126, and ZLI-3308, ZLI-3273, ZLI-4801, ZLI-4692, ZLI-5048-000, ZLI-5049-100, ZLI-5081, ZLI-5100-100, ZLI-5800-000, and TL202, TL203, TL204, TL205, and MLC-6267, MLC-6284, MLC-6287, MLC-6288, MLC-6406, MLC-6422, MLC-6423, MLC-6425, MLC-6435, MLC-6437, MLC-7700, MLC-7800, MLC-9000, MLC-9100, MLC-9200, MLC-9300, MLC-10000, and GT3-23001, GT3-24002, GT3-24004, GT3-25003, and TUD-224, TUD-424, TUD-325, and MLC-6041-100, MDA-00-350, K15. In addition, some embodiments utilize new LC mixtures, such as for example, New Mix A, B and C from Merck, Germany, which are disclosed in Manabe, Atsutaka. "Liquid crystals for microwave applications." SPIE OPTO. International Society for Optics and Photonics, 2013.

For mass production of some embodiments of the phase shifters disclosed herein, standard printed circuit substrate materials can be utilized for dielectrics 106 and 112. Examples of commercially available laminates that may be used for dielectrics 106 and 112 in such embodiments include, but are not limited to, those from Rogers Corporation: RT/duroid, ULTRALAM, TMM and XT/duroid high frequency laminates, RO3000 series, RO3200 series and RO4000 series high frequency laminates, RO3730, RO4500 and RO4730 laminates. In other embodiments, dielectrics 106 and 112 are made of alumina ceramic, which may be useful in embodiments requiring higher fabrication precision. An example of an alumina ceramic product is ADS-996 from CoorsTek.

In some embodiments, the permittivity tuning range of LC layer 114 is considered when selecting the substrate materials for dielectrics 106 and 112. In such embodiments, the nominal permittivity of the substrate, that is both dielectric 106 and dielectric 112, may be selected to be close to the median of the LC's permittivity in order to reduce the permittivity discontinuity in the phase shifter. An example combination of materials for LC layer 114 and dielectric layers 106 and 112 is Merck New Mix C (with relative permittivity between 2.5 and 3.5) and Rogers RT/duroid 6002 (with nominal relative permittivity 2.94), respectively. This combination of LC material and dielectric material is used in various embodiments of the phase shifter described herein.

In some embodiments, the TE10 mode is the only mode permitted to propagate in the phase shifter. On the other hand, as a rule of thumb, the accepted limits of the operation frequency of a waveguide are between 125% and 189% of the lower cutoff frequency, in an embodiment. Accordingly, in an embodiment, the width of the dielectric section W is selected to satisfy the rule throughout the permittivity tuning range from $\epsilon_{low}$ to $\epsilon_{high}$. Therefore, in such embodiments, W is selected so that the conditions 1. $25/(2f_0\sqrt{\mu\epsilon_{low}}) \leq W \leq 1.89/(2f_1\sqrt{\mu\epsilon_{low}})$ and 1. $25/(2f_0\sqrt{\mu\epsilon_{high}}) \leq W \leq 1.89/(2f_1\sqrt{\mu\epsilon_{high}})$ are satisfied simultaneously, which corresponds to the condition 1. $25/(2f_0\sqrt{\mu\epsilon_{low}}) \leq W \leq 1.89/(2f_1\sqrt{\mu\epsilon_{high}})$. In some fabrication processes, the width W1 of dielectric 112 has a lower limit. Therefore, in some embodiments, in order to have the maximum LC filling rate (i.e. the largest possible LC layer and in turn a maximum phase tuning range), W is chosen to be close to but no more than $1.89/(2f_1\sqrt{\mu\epsilon_{high}})$, taking into consideration the maximum tolerance of the fabrication process.

In addition, in such an embodiment, the total thickness T of dielectric layers 106 and 112 can be chosen to be less than half the width W. The maximum tuning voltage required to achieve a particular phase tuning range can be reduced by reducing the total thickness T of dielectric layers 106 and 112 while maintaining a constant thickness ratio ($t_b/t_a$) between dielectric layers 112 and 106. A larger phase tuning range can be achieved by increasing the thickness ratio ($t_b/t_a$) between 112 and 106 while maintaining a constant thickness T of dielectric layers 106 and 112, though this may result in a higher maximum tuning voltage. Accordingly, in some embodiments, the thickness $t_a$ of dielectric layer 106 is selected to be as thin as possible while maintaining sufficient mechanical strength. Then, the thickness $t_b$ of dielectric layer 112 is selected to provide the desired trade-off between a larger phase tuning range and a lower maximum tuning voltage.

Figure 2:
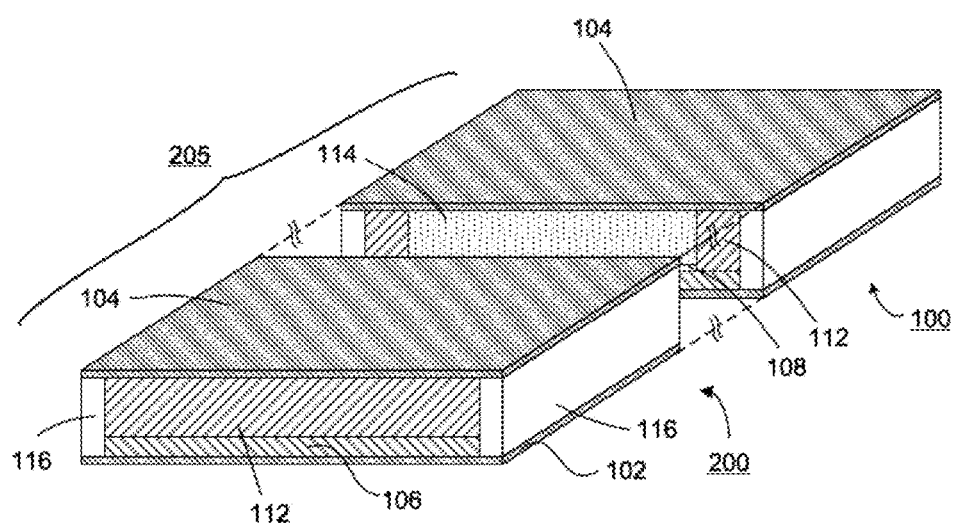
FIG. 2 is a perspective view of an example phase shifter integrated with a substrate integrated waveguide, in accordance with an embodiment of the present disclosure.

In an embodiment, phase shifter 100 can be seamlessly integrated with a standard substrate integrated waveguide (SIW) 200, as illustrated in FIG. 2. In an embodiment, electrode 108 is situated below LC layer 114 and does not extend beyond the compartment in which LC layer is situated. In other words, in such an embodiment, electrode 108 only exists within the footprint of LC layer 114. As explained above, in other embodiments, electrode 108 can extend beyond the footprint of LC layer 114. In some embodiments, during circuit fabrication, the SIW portion 200 and the phase shifter portion 100 are fabricated together seamlessly as an integrated structure 205.

In various embodiments of phase shifter 100, electrode 108 can take on a variety of different forms. Two different embodiments, each having a different structure for the electrode, will be discussed in relation to FIGS. 3 to 6.

Figure 3:
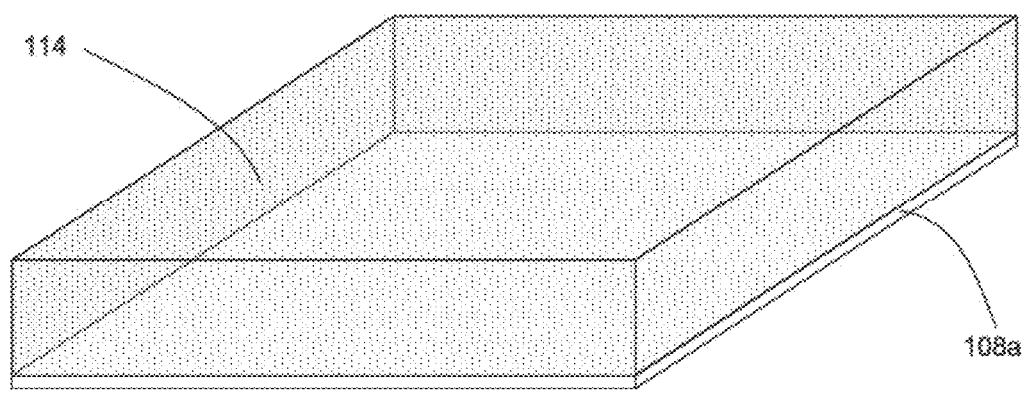
FIG. 3 is a perspective view of the liquid crystal layer and an example electrode of the phase shifter of FIG. 1A, in accordance with an embodiment of the present disclosure.

Reference is first made to FIG. 3, which illustrates a perspective view of LC layer 114 and electrode 108a of phase shifter 100, according to an embodiment. For purposes of clarity, the other parts of phase shifter 100 are omitted from FIG. 3. These other parts can be the same as described above and illustrated in FIG. 1A. In this embodiment, the electrode 108a is a conductive layer having the same shape as the footprint of LC layer 114. In other words, in an embodiment, electrode 108a has a planar surface corresponding to the footprint of LC layer 114.

Figure 4:
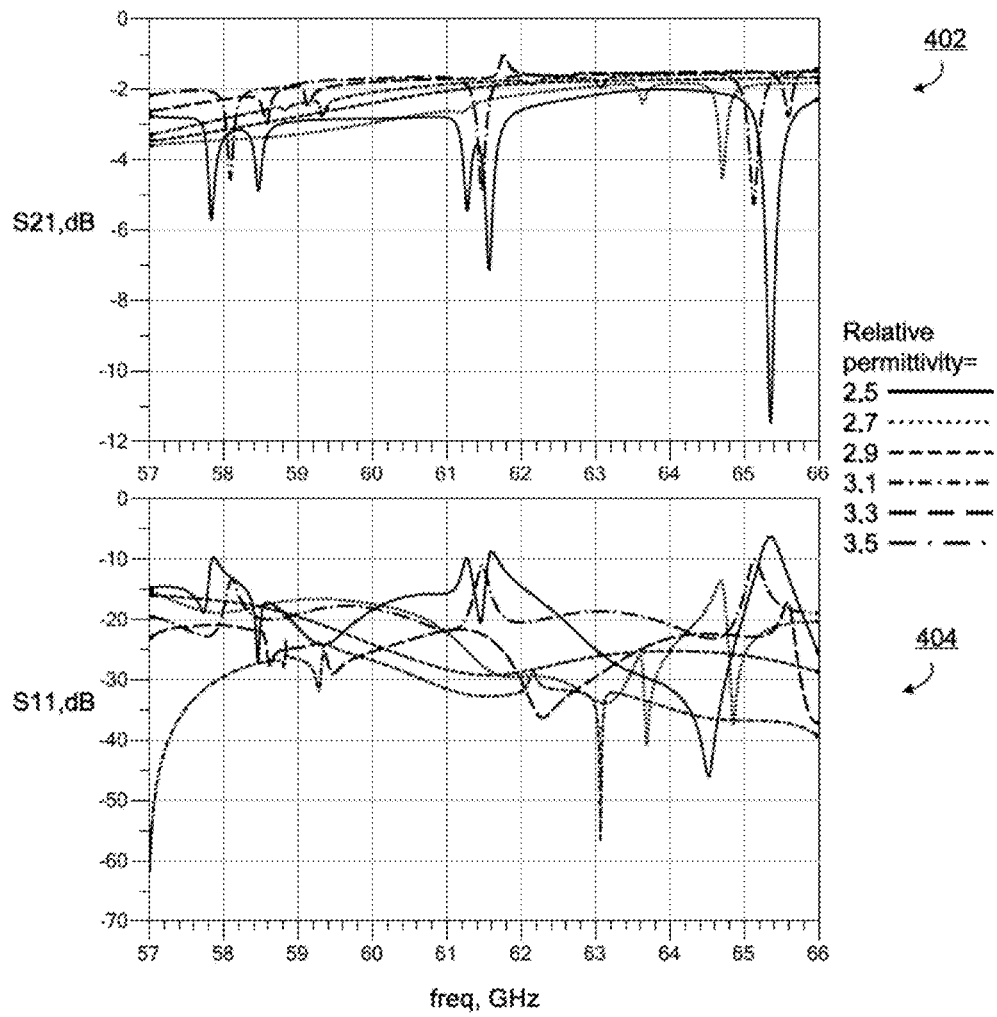
FIG. 4 illustrates graphs showing scattering parameters of a phase shifter incorporating the electrode of FIG. 3.

Reference is now made to FIG. 4, which illustrates graphs showing the simulated S (Scattering) parameters with different values of relative permittivity (from 2.5 to 3.5, in 0.2 steps) of LC layer 114 for the embodiment of FIG. 3. Graph 402 is a plot of the S21 parameter and graph 404 is a plot of the S11 parameter. Given that various embodiments of phase shifter 100 may be operated as a two port reciprocal device, one can name the two ports as port one and port two arbitrarily. Then under the condition that port two is connected to a matched load and port one is connected to a microwave source, the S11 parameter represents the ratio between the microwave power coming out of port one and the microwave power injected into port one; the S21 parameter represents the ratio between the microwave power absorbed by the matched load to the microwave power injected into port one. In some embodiments, when the two parameters are expressed in dB format, it may be advantageous to have S11 as small as possible and S21 as close to zero as possible.

For the simulation corresponding to FIG. 4, the following parameters were selected: length of the phase shifter is 18.5 mm, the thickness $t_a$ of dielectric layer 106 is 5 mil, the thickness $t_b$ of dielectric layer 112 is 20 mil, the width $w_c$ of LC layer 114 is 1.5 mm, the width of the dielectric section W is 1.95 mm, and the thickness of each of ground plane 102, ground plane 104, and electrode 108a is 5 μm. From the graphs of FIG. 4, one can see that several transmission defects appear at different frequencies for different values of relative permittivity, represented as notches on the S21 curve and peaks on the S11 curve. This phenomenon is caused by the difference between the permittivity of LC layer 114 and the permittivity of dielectric layer 106, as well as the shape of the electrode 108a. Due to the presence of the electrode 108a within the structure, two modes of microwave signal could exist below and above the electrode respectively at the same time. Furthermore, if the permittivity of the LC layer 114 and that of the dielectric layer 106 are different, the phase velocity of the two modes could be different. When the two modes pass through the phase shifter, they could be out of phase, which can attenuate the transmission and enhance the reflection at some frequencies.

Figure 5A:
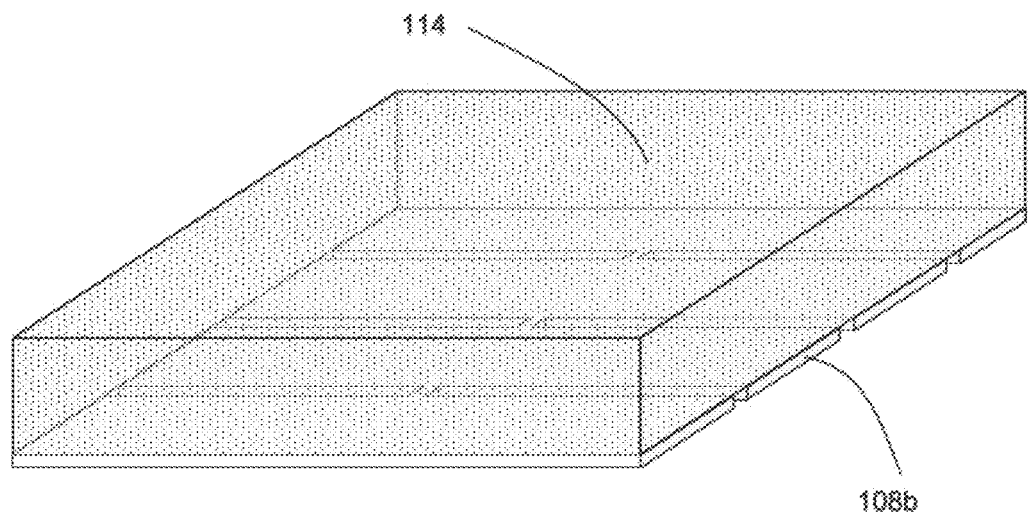
FIG. 5A is a perspective view of the liquid crystal layer and another example electrode of the phase shifter of FIG. 1A, in accordance with another embodiment of the present disclosure.
Figure 5B:
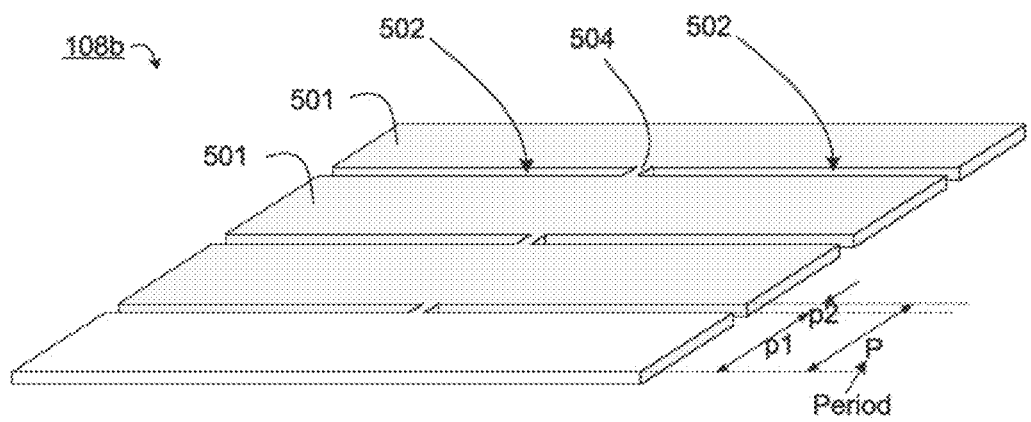
FIG. 5B is a perspective view of the electrode of FIG. 5A.

Reference is now made to FIGS. 5A and 5B. FIG. 5A illustrates a perspective view of LC layer 114 and electrode 108b of phase shifter 100, according to another embodiment. For purposes of clarity, the other parts of phase shifter 100 are omitted from FIG. 5A. For greater clarity, FIG. 5B illustrates a perspective view of electrode 108b of FIG. 5A on its own. In some embodiments, the configuration of electrode 108b can help to reduce or eliminate the transmission defects discussed in relation to FIGS. 3 and 4. In the embodiment illustrated in FIGS. 5A and 5B, electrode 108b is shaped like a grating having a plurality of electrode sections 501 that are spaced apart by gaps 502. In order to maintain an equipotential throughout electrode 108b, the gaps 502 between electrode sections 501 do not extend all the way through the electrode such that each electrode section 501 is connected to a neighboring electrode section 501 by links 504. In the embodiment illustrated in FIGS. 5A and 5B, the gaps 502 are symmetrical and links 504 are positioned at the center of the lengths of each of the electrode sections 501 of electrode 108b. In other embodiments, links 504 may be positioned elsewhere than at the center of the lengths of electrode sections 501. In an embodiment, electrode 108b can also be considered to be comprised of separate electrodes that are coupled by links 504 where the links 504 are made of the same material as the electrodes.

In various embodiments, electrode sections 501 are substantially identically shaped. In some embodiments, electrode sections 501 have a rectangular shape. In some embodiments, the links 504 are made as thin as possible such that gaps 502 almost extend all the way through between the electrode sections 501. In an embodiment, electrode 108b can be said to comprise a series of equally spaced rectangular electrode ribs, the electrode ribs corresponding to electrode sections 501, which are linked at the center of their lengths by links 504. In various embodiments, electrode sections 501 are only linked at the center and there are no links or connections at the extremities of the electrode sections 501.

In various embodiments, the structure of electrode 108b does not permit a parasitic mode of signal with a different phase velocity to be supported below electrode 108b. In other words, the two modes that are supported by electrode 108a in FIG. 3 merge with each other if the gaps 502 are present in the electrode structure as shown with electrode 108b.

Figure 6:
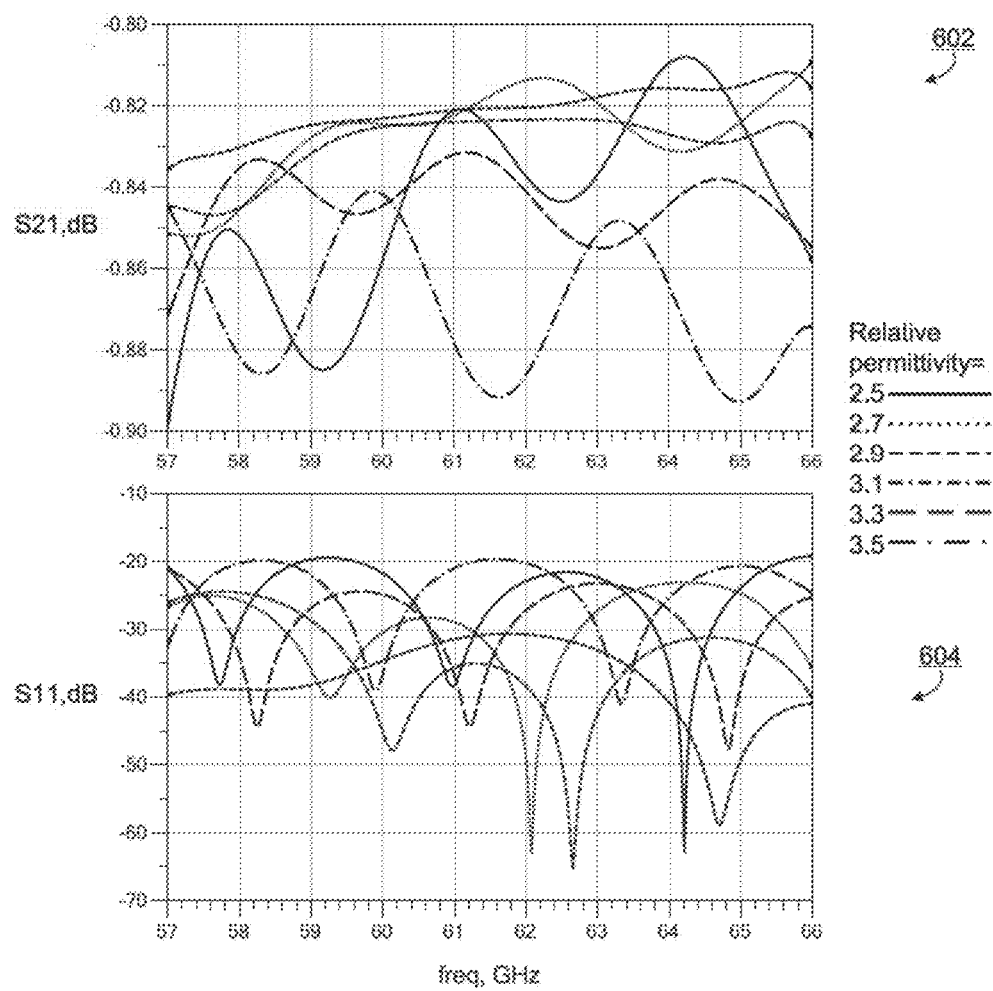
FIG. 6 illustrates graphs showing scattering parameters of a phase shifter incorporating the electrode of FIGS. 5A and 5B.

Reference is now made to FIG. 6, which illustrates graphs showing the simulated S (Scattering) parameters with different values of relative permittivity (from 2.5 to 3.5, in 0.2 steps) of LC layer 114 for an embodiment of a phase shifter incorporating the electrode of FIGS. 5A and 5B. Graph 602 is a plot of the S21 parameter and graph 604 is a plot of the S11 parameter. For the simulation corresponding to the graphs of FIG. 6, the dimensions of the phase shifter are the same as those discussed above in relation to FIG. 4, except that the electrode is different. The graphs of FIG. 6 show that transmission defects have been mitigated as compared to the embodiment of FIGS. 3 and 4. The reflection is less than −20 dB and the insertion loss is less than 1 dB. Accordingly, in various embodiments, electrode 108b as shown in FIGS. 5A and 5B may be selected for its performance. In various embodiments, the period P of the electrode 108b is selected to be much less than the guided wavelength in order to minimize the occurrence of transmission defects. In some embodiments, the period P of the electrode 108b is selected to be less than a quarter of the guided wavelength at the highest operating frequency, which are the dimensions used in the simulation corresponding to FIG. 6.

The period (P) of electrode 108b refers to the width (p1) of one electrode section 501 plus the length (p2) of a link 504 (see FIG. 5B), where the width of the electrode section 501 and the length of the link 504 are in the same direction. In some embodiments, electrode 108b is comprised of repetitive elements (e.g. the electrode sections 501 and links 504) and the period refers to period of repetition. In some embodiments, p2 is selected to be as small as the fabrication process allows for and p1 is selected to be as large as possible without creating a transmission defect. This will result in a maximum possible electrode area for electrode 108b, which allows for a substantially uniform static electric field distribution.

Various embodiments of phase shifter 100 can be fabricated using multi-layer printed circuit board (PCB) fabrication techniques. In an embodiment, the basic material for such fabrication is a PCB laminate having one dielectric layer and two copper layers which are attached on each side of the dielectric layer. In an embodiment, the basic fabrication process includes copper etching, via (hole) cutting, via (hole) metallization and so forth as will be explained in greater detail below. In an embodiment, in order to realize the structure in FIG. 1A, conductive sidewalls 116 are generated by via cutting and metallization. Accordingly, in such an embodiment, an additional substrate layer is used above the top ground plane 104 to allow for the formation of an electric short (metallization) through ground plane 102, sidewalls 116 and ground plane 104. The additional substrate layer and the top ground plane 104 are provided by a PCB laminate.

Figure 7A:
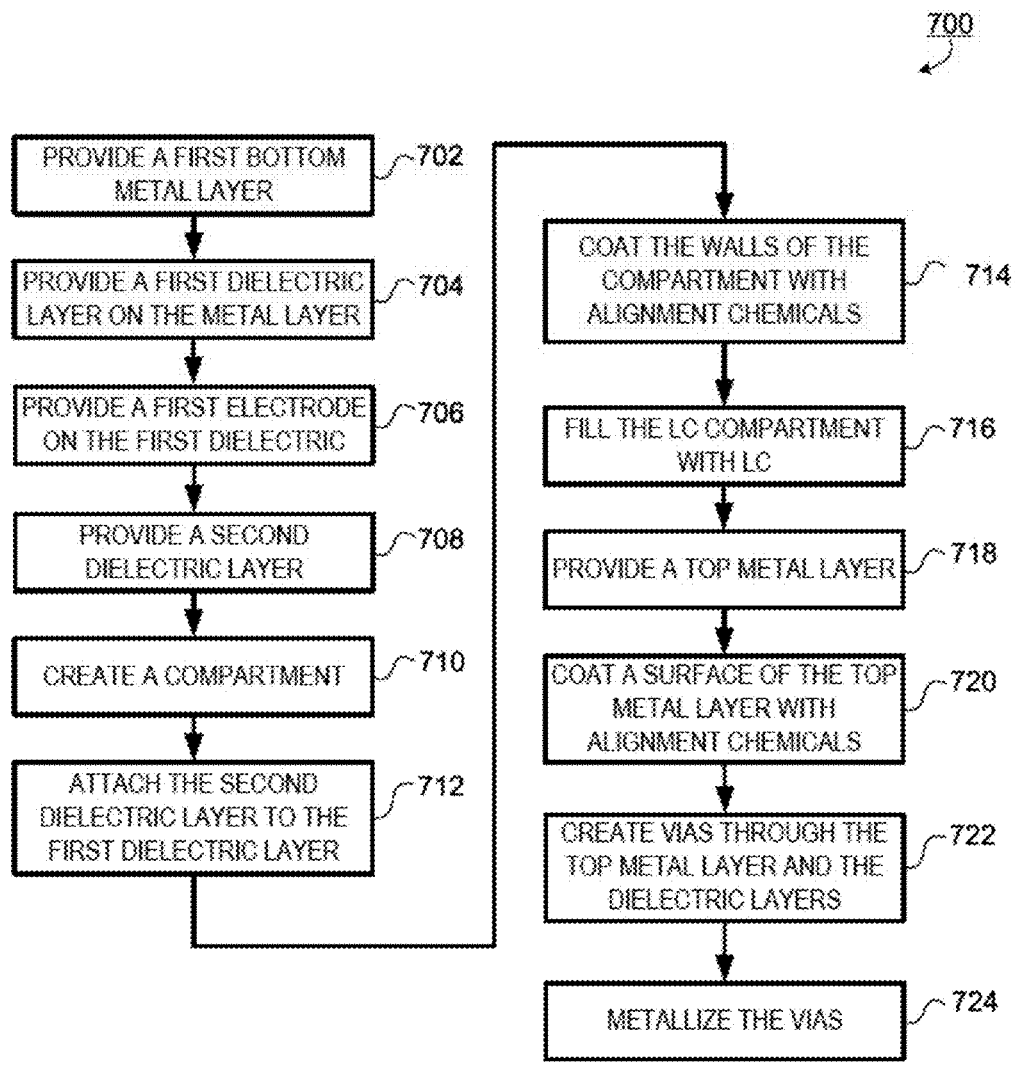
FIG. 7A is a flowchart diagram illustrating an example process of fabricating a phase shifter, in accordance with an embodiment of the present disclosure.

Reference is first made to FIG. 7A, which illustrates a method of fabrication, in accordance with an embodiment of the present disclosure. Method 700 may contain additional or fewer processes than shown and/or described, and may be performed in a different order.

At 702, a first metal layer is provided. In an embodiment, this metal layer corresponds to ground plane 102.

At 702, a first dielectric layer is provided. In an embodiment, this dielectric layer corresponds to dielectric 106.

At 706, an electrode, which in an embodiment corresponds to electrode 108, is created on the surface of first dielectric layer that is opposite the first metal layer.

At 708, a second dielectric layer is provided. In an embodiment, this dielectric layer corresponds to dielectric 112.

At 710, a compartment is created to hold LC layer 114. In an embodiment the compartment can comprise a grove or cavity that is carved in the second dielectric. In other embodiments, a hole can be cut through the second dielectric and the compartment is formed once the second dielectric layer is attached to the first dielectric layer.

At 712, the second dielectric layer is attached to the first dielectric layer. In an embodiment, the dielectric layers are attached to one another by chemically bonding them together. In some embodiments, epoxy is used to bond the dielectric layers together. In some embodiments, the dielectric layers are bonded together by other methods other than the use of chemical bonding agents.

At 714, the walls of the compartment are coated with appropriate alignment chemicals as discussed above in order to achieve a consistent orientation of LC molecules in LC layer 114, for example in a direction perpendicular to the electric field of a microwave signal passing through the LC layer 114. In an embodiment, this corresponds to LC molecules being oriented parallel to the plane of electrode 108.

At 716, the compartment is filed with liquid crystal.

At 718, a top metal layer is provided over the second dielectric. In an embodiment, the top metal layer corresponds to top ground plane 104.

At 722, a surface of the top metal layer, for example, the surface that will be in contact with LC layer 114, is coated with alignment chemicals.

At 724, vias are created through the top metal layer as well as the first and second dielectric layers.

At 726, the vias are metallized. In an embodiment, the metallized vias correspond to sidewalls 116.

Figure 7B:
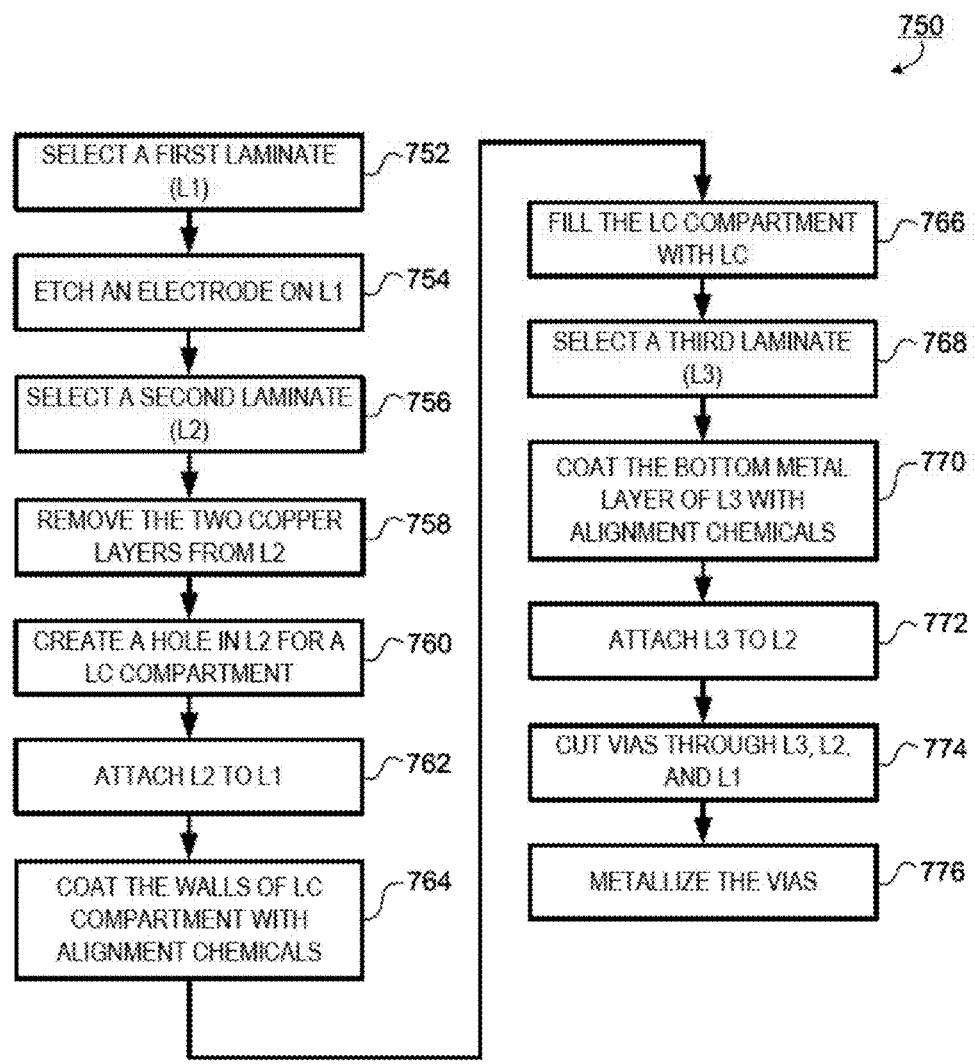
FIG. 7B is a flowchart diagram illustrating an example process of fabricating a phase shifter, in accordance with an embodiment of the present disclosure.
Figure 8:
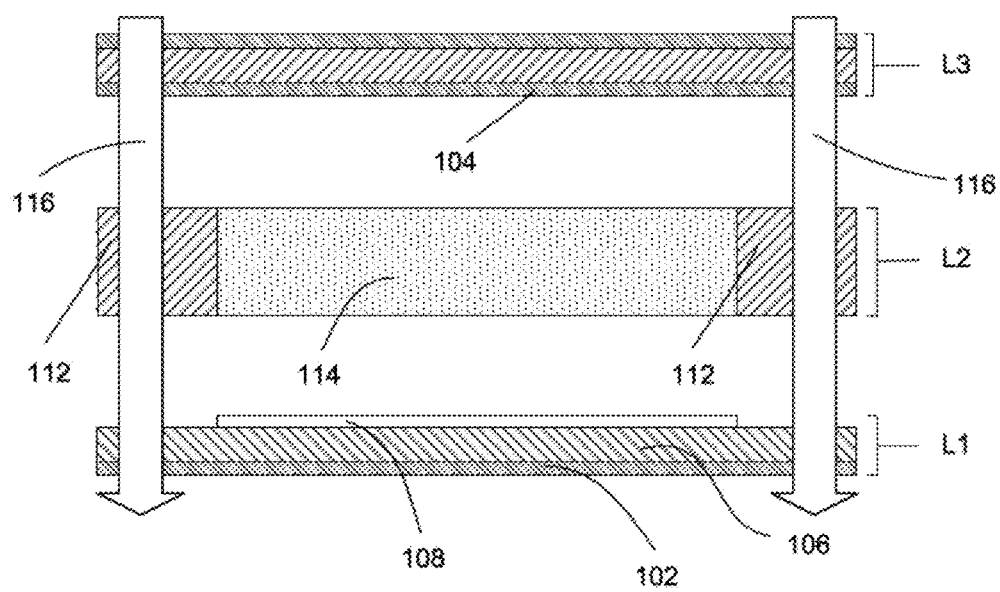
FIG. 8 is a schematic diagram illustrating an example of the order in which various layers are combined in the process of FIG. 7B, in accordance with an embodiment of the present disclosure.

An example fabrication process will now be discussed in relation to FIGS. 7 and 8. FIG. 7B is a flow chart diagram illustrating a method of fabrication in accordance with an embodiment of the present disclosure. FIG. 8 is a schematic diagram illustrating a representation of how the various layers are combined during the fabrication method of FIG. 7B.

The method 750 illustrated in FIG. 7B relates to a fabrication method using multi-layer printed circuit board (PCB) fabrication techniques. Method 750 may contain additional or fewer processes than shown and/or described, and may be performed in a different order.

At 752, a first laminate (L1) is selected. As previously mentioned, in an embodiment, the first laminate L1 includes one dielectric layer and two copper layers. As mentioned above, in other embodiments, other metals other than copper may be used.

At 754, electrode 108 is created on L1 by etching one of the copper layers.

At 756, a second laminate (L2) is selected.

At 758, the two copper layers are removed from L2.

At 760, a hole, having the shape of the LC layer's footprint, is created in L2. The hole may be created by cutting through L2. Accordingly, this generates a compartment or container for the LC once L2 is attached to L1.

At 762, L2 is attached to L1. In an embodiment, L2 is chemically bonded to L1. In an embodiment, L2 is bonded to L1 with epoxy. In an embodiment, when L2 is attached to L1, the hole in L2 corresponding to the LC compartment is aligned with electrode 108. In some embodiments, electrode 108 extends beyond the dimensions of the hole and the hole is not carefully aligned with electrode 108.

At 764, the inner walls of the LC compartment are coated with alignment chemicals. In an embodiment, both walls of the dielectric layer 112 and the surface of the electrode 108 are coated with alignment chemicals. In an embodiment the surfaces of dielectric layer 112 and electrode 108 are coated with appropriate alignment chemicals as discussed above in order to achieve orientations of LC molecules in LC layer 114, that are generally perpendicular to the direction of the electric field of a signal propagating through LC layer 114. In an embodiment, this corresponds to molecule orientations that are parallel to the plane of electrode 108. Various examples of alignment chemicals are described above.

At 766, the LC compartment is filled with LC.

At 768, a third laminate (L3) is selected.

At 770, a surface of the bottom copper layer of L3, which corresponds to ground plane 104, is coated with alignment chemicals.

At 772, L3 is attached to L2. Therefore, L3 covers the LC compartment. In an embodiment, L3 is chemically bonded to L2. In an embodiment, L3 is bonded to L2 with epoxy. The bottom copper layer of L3 provides ground plane 104.

At 774, vias are cut through L3, L2, and L1.

At 776, the vias are metallized and this forms the sidewalls 116. The metal sidewalls provide an electrical short between the top ground plane 104 and bottom ground plane 102.

As will be understood by a person of skill in the art, the structure produced by the fabrication method of FIG. 7B can include not only one or more phase shifters but also one or more waveguide sections that are integrated with the phase shifter(s). In an example embodiment, the electrode, hole, and LC would be created only in the portion of the structure where the phase shifter is located, and the remaining portion of the structure would correspond to a substrate integrated waveguide similar to the structure illustrated in FIG. 2.

In some embodiments of the phase shifters disclosed herein, electrode 108 is not in contact with LC layer 114. For example, in some embodiments, instead of cutting a hole all the way through dielectric 112, a groove or a well is cut in dielectric 112 to form the compartment for LC layer 114. In such embodiments, there can be a layer of dielectric 112 separating electrode 108 and LC layer 114. However, some fabrication processes may not support creating the groove or well in the dielectric. In addition, by not cutting all the way through the dielectric, the depth of the LC compartment and therefore the thickness of LC layer 114 is reduced, which in turn may reduce the tuning range of phase shifter.

Figure 9:
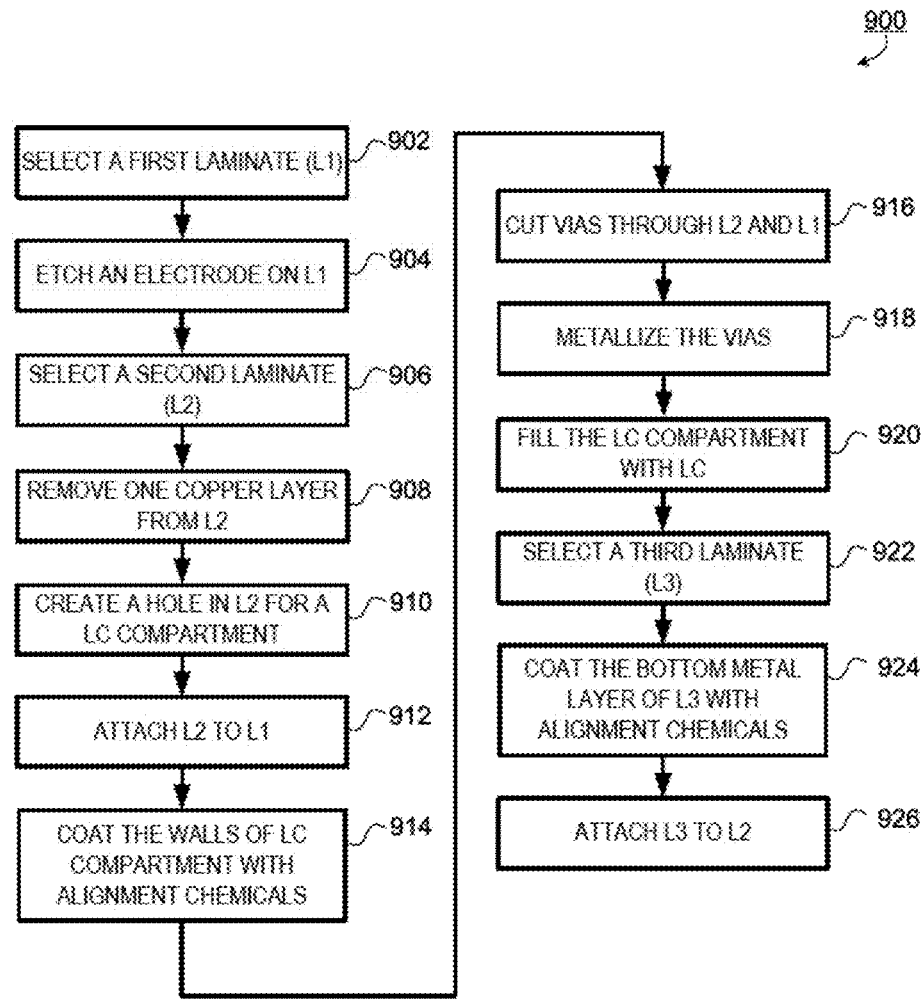
FIG. 9 is a flowchart diagram illustrating an example process of fabricating a phase shifter, in accordance with another embodiment of the present disclosure.
Figure 10A:
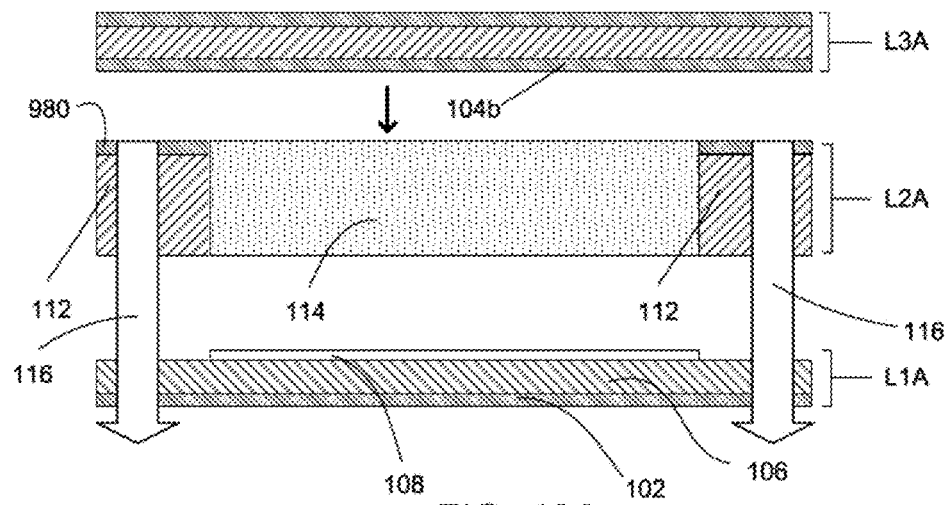
FIG. 10A is a schematic diagram illustrating an example of the order in which various layers are combined in the process of FIG. 9, in accordance with an embodiment of the present disclosure.
Figure 10B:
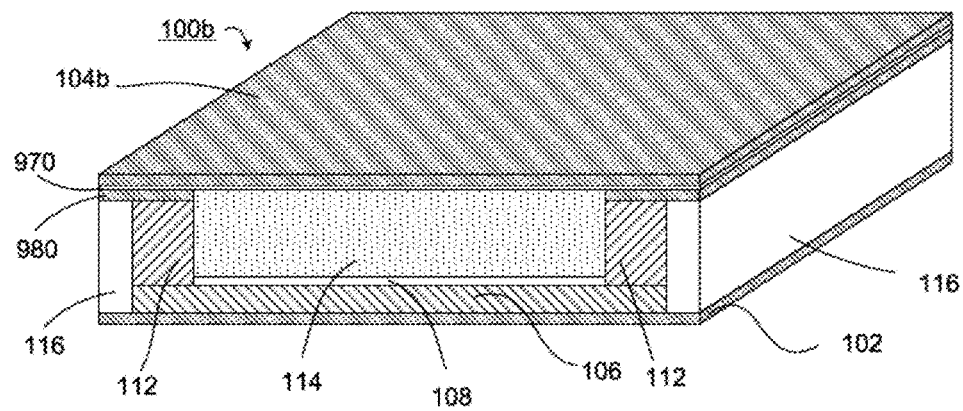
FIG. 10B is a perspective view of an example phase shifter constructed in accordance with the process of FIG. 9, with some layers omitted for clarity.

An alternative fabrication method will be discussed in relation to FIGS. 9, 10A, and 10B. FIG. 9 is a flow chart diagram illustrating a method 900 of fabrication in accordance with an embodiment of the present disclosure. FIG. 10A is a schematic diagram illustrating a representation of how the various layers are combined during the fabrication method of FIG. 9. FIG. 10B illustrates an embodiment of a phase shifter 100*b* that is produced as a result of the method 900 illustrated in FIG. 9, with the substrate and top copper layer of L3 omitted for clarity.

The method 900 illustrated in FIG. 9 relates to a fabrication method using multi-layer printed circuit board (PCB) fabrication techniques. Method 900 may contain additional or fewer processes than shown and/or described, and may be performed in a different order.

At 902, a first laminate (L1A) is selected. As previously mentioned, in an embodiment, the laminate is with one dielectric layer and two copper layers. As mentioned above, in other embodiments, metals other than copper may be used.

At 904, electrode 108 is created on L1A by etching one of the copper layers.

At 906, a second laminate (L2A) is selected.

At 908, one of the copper layers is removed from L2A.

At 910, a hole, having the shape of the LC layer's footprint, is created in L2A. The hole may be created by cutting though L2A. Accordingly, this generates a compartment or container for the LC once L2A is attached to L1A.

At 912, L2A is attached to L1A with the non-copper-surface of L2A being placed against L1A. In an embodiment, L2A is chemically bonded to L1A. In an embodiment, L2A is bonded to L1A with epoxy. In an embodiment, when L2 is attached to L1, the hole in L2 corresponding to the LC compartment is aligned with electrode 108. In some embodiments, electrode 108 extends beyond the dimensions of the hole and the hole is not carefully aligned with electrode 108.

At 914, the inner walls of LC compartment are coated with alignment chemicals. In an embodiment, both walls of the dielectric layer 112 and the surface of the electrode 108 are coated with the alignment chemicals. In an embodiment the surfaces of dielectric layer 112 and electrode 108 are coated with different alignment chemicals in order to achieve orientations of LC molecules in LC layer 114, that are generally perpendicular to the direction of the electric field of a signal propagating through LC layer 114. In an embodiment, this corresponds to molecule orientations that are parallel to the plane of electrode 108. Various examples of alignment chemicals are described above.

At 916, vias are cut through L2A and L1A.

At 918, the vias are metallized and this forms the sidewalls 116.

At 920, the LC compartment is filled with LC. In some embodiments, the LC compartment is filled after the vias have been metallized.

At 922, a third laminate (L3A) is selected.

At 924, a surface of the bottom copper layer of L3A, which corresponds to ground plane 104b, is coated with alignment chemicals.

At 926, L3A is attached to L2A. In an embodiment, L3A is chemically bonded to L2A. In an embodiment, L3A is bonded to L2A with epoxy. In some embodiments, the dielectric layers are bonded together by methods other than the use of chemical bonding agents. The bottom copper layer of L3A provides ground plane 104b. In an embodiment, the portion of the bottom metal layer of L3A overlying the LC compartment is not covered with epoxy. In some embodiments, this is accomplished by utilizing suitable masks during the fabrication process.

FIG. 10B illustrates an embodiment, of a phase shifter 100b that is produced as a result of the method 900 illustrated in FIG. 9. Given that in method 900, the vias are cut through only L2A and L1A, ground plane 104b of phase shifter 100b is not shorted to side walls 116 and ground plane 102. Accordingly, in phase shifter 100b only two laminates are dedicated to the phase shifter. The bottom copper of L3A is used as a shielding cover and the top copper and the dielectric substrate of L3A can be used to support other circuits in, for example, an integrated multi-layer system.

In addition, method 900 can be used to produce a waveguide portion and a phase shifter portion similar to the structure shown in FIG. 2. In an embodiment, phase shifter portion corresponds to the part of the structure where the LC compartment is situated and the waveguide portion corresponds to the portion where the LC compartment is absent. In some embodiments, non-conductive epoxy is utilized. In other embodiments, a conductive bonding agent such as a conductive epoxy is utilized. Epoxy layer 970 separates ground plane 104b from the top metal layer 980 of L2A and therefore from sidewalls 116. The impact of this epoxy gap between ground plain 104b and sidewalls 116, when the epoxy is a non-conductive epoxy, is discussed below in relation to FIG. 11. When a non-conductive boding agent is utilized, ground plane 104b is not electrically coupled to sidewalls 116 and ground plane 102 in the phase shifter portion of the structure. Accordingly, in such embodiments, the phase shifter portion of the structure produced by method 900 of FIG. 9 is not a waveguide in the conventional sense. However, if the epoxy gap is small enough, the phase shifter portion of the structure produced by method 900 of FIG. 9 supports the same mode of microwave signals. It will be understood by those of skill in the art that, even when a non-conductive epoxy is utilized for epoxy layer 970, the waveguide portion produced by method 900 will be a true waveguide as the top metal layer 980 of L2A is electrically coupled to the side walls and extends over the dielectric in the waveguide portion of the apparatus.

Figure 11:
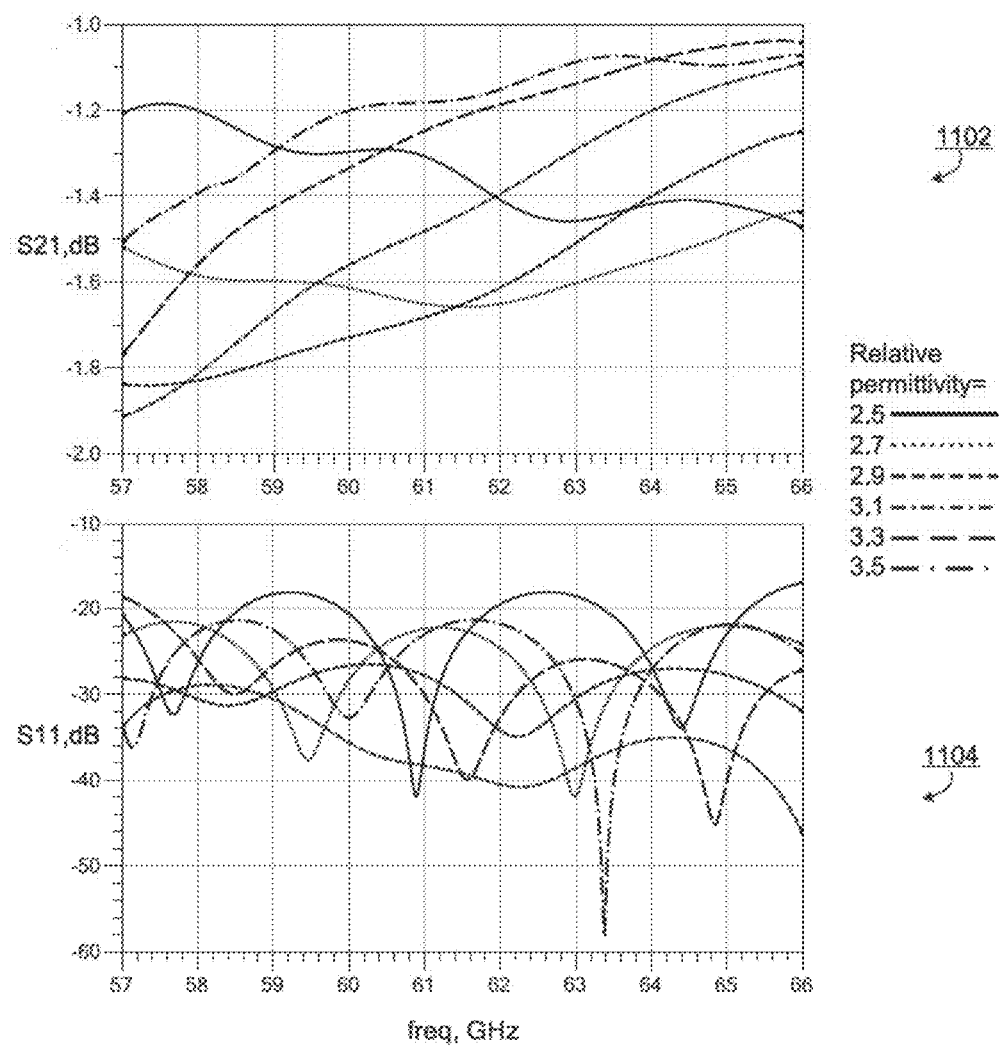
FIG. 11 illustrates graphs showing scattering parameters of a phase shifter of FIG. 10, incorporating the electrode of FIG. 5.

Reference is now made to FIG. 11, which illustrates graphs 1102 and 1104 showing the simulated S parameters for phase shifter 100b of FIG. 10B, when non-conductive bonding material is used to bond L3A to L2A. Accordingly, FIG. 11 allows one to examine the impact of the epoxy layer 970 through simulation. The dimensions of the phase shifter, including the electrode, used in the simulation corresponding to FIG. 11 are the same as the dimensions used for the simulation of FIG. 6. From comparing FIGS. 11 and 6, it can be seen that in FIG. 11, the S21 parameter has decreased by less than 1 dB and the S11 parameters are still mostly less than −20 dB. The transmission performance in FIG. 11 is well maintained as compared to FIG. 6.

Figure 12:
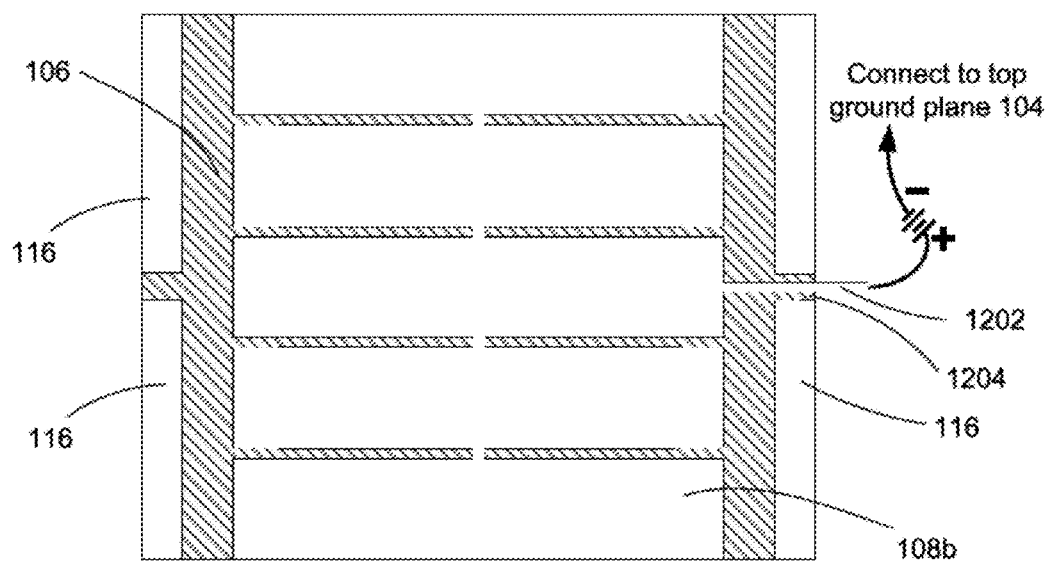
FIG. 12 is a top cross-sectional view of an example phase shifter, in accordance with an embodiment of the present disclosure.

Reference is next made to FIG. 12, which illustrates a top cross-sectional view of a phase shifter, in accordance with an embodiment of the present disclosure. The view in FIG. 12 illustrates the connection of a DC bias line 1202 to electrode 108b. In this embodiment, there is a sidewall opening 1204 in at least one of the sidewalls 116. Bias line 1202 is extended from the electrode 108b through the sidewall opening 1204 to the outside of the phase shifter and connected to a bias voltage source, for example, the positive terminal of the DC bias. In an embodiment, the vias on either side of the phase shifter are not continuous but are cut in sections that are spaced apart from each other. In some such embodiments, the sidewalls 116 are not continuous along the length of the phase shifter and a dielectric can fill the space of sidewall opening 1204, which is the space between side walls 116. In some such embodiments, the bias line is created by etching it together with the electrode and the bias line is positioned so as to be aligned with one of the spaces between the vias. In some such embodiments, the bias line extends out of the phase shifter between dielectrics 106 and 112. The negative terminal of the DC bias is coupled to the top ground plane 104. In an embodiment, sidewall opening 1204 is made to be smaller than $\frac{1}{10}$ of the free space wavelength of the microwave signal propagating in the phase shifter, such that the radiation loss from the gap is negligible.

Figure 13:
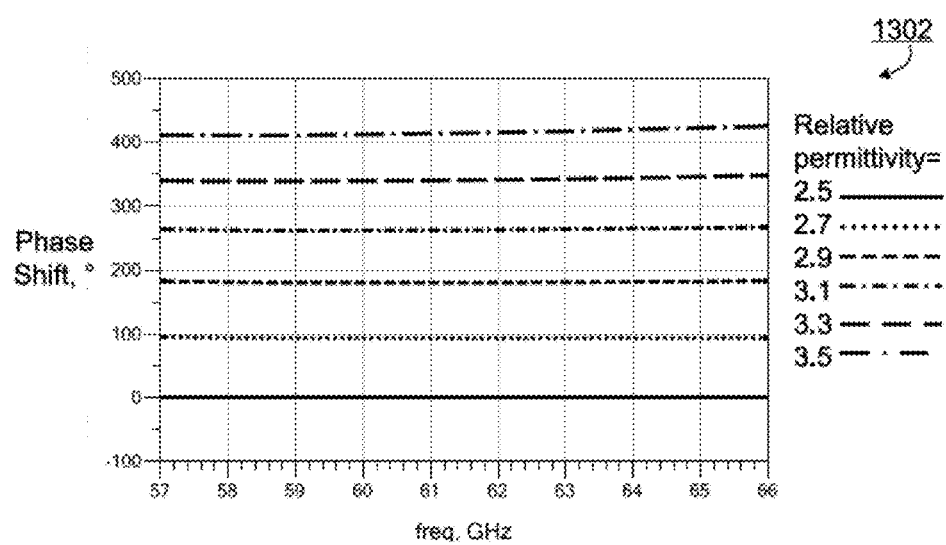
FIG. 13 illustrates a graph showing the phase tuning performance of the example phase shifter of FIG. 10B.

FIG. 13 illustrates a graph 1302 showing the phase tuning performance of the phase shifter 100b of FIG. 10B. The dimensions are the same as those used in FIGS. 4 and 6. From FIG. 13, it can be seen that the phase can be tuned between 0° and 415° with the relative permittivity of LC changed from 2.5 to 3.5. The curve corresponding to relative permittivity of 3.5 exhibits the least flat of the curves of FIG. 13 and, across the range of frequencies, it exhibits a maximum deviation of phase of 9°. The phase shift of each of the curves is with respect to the phase at relative permittivity of 2.5 at each frequency.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. An apparatus comprising:
a housing having first, second, third, and fourth conductive walls, each conductive wall being opposite one of the other walls;
a dielectric situated within the housing, the dielectric defining a compartment within the housing;
an electrode aligned with the compartment;
a liquid crystal (LC) layer filling the compartment; and
a bias line coupled to the electrode.

2. The apparatus of claim 1, wherein the electrode forms at least a portion of a surface of the compartment.

3. The apparatus of claim 1, further comprising:
a waveguide portion, the waveguide portion including the dielectric in substantially an entire volume between the conductive walls; and
a phase shifter portion, the phase shifter corresponding to a portion of the apparatus including the compartment.

4. The apparatus of claim 1, further comprising an opening in one of the conductive walls, wherein the bias line passes through the opening.

5. The apparatus of claim 1, wherein the electrode comprises:
a plurality of sections, each of the plurality of sections being spaced apart from adjacent sections; and
links electrically connecting each of the plurality of sections to an adjacent section.

6. The apparatus of claim 1, wherein the housing is shaped as a rectangular prism.

7. The apparatus of claim 1, further comprising at least one alignment chemical coating on at least one surface of the compartment.

8. The apparatus of claim 7, wherein the at least one alignment chemical coating is selected to, in the absence of an applied static electric field, align molecules of the LC layer in an orientation that is parallel to a plane of the electrode.

9. A method of fabricating a microwave apparatus, the method comprising:
providing a bottom metal layer;
providing a first dielectric layer on top of the first metal layer;
providing an electrode on the first dielectric layer, the first electrode being situated on a surface of the dielectric layer opposite the first metal layer;
providing a second dielectric layer;
creating a compartment in the second dielectric layer, the compartment having a dimension corresponding to the electrode;
attaching the second dielectric layer to the first dielectric layer in a position that aligns the compartment with the electrode;
filling the compartment with a liquid crystal (LC) layer;
providing a top metal layer on top of the second dielectric layer;
creating vias through the top metal layer, second dielectric layer, and first dielectric layer; and
metallizing the vias to provide an electrical connection between the top metal layer and the bottom metal layer.

10. The method of claim 9, wherein providing the bottom metal layer and providing the first dielectric comprise providing a first laminate layer, the first laminate layer being a printed circuit board laminate having a substrate layer, a top metal layer, and a bottom metal layer.

11. The method of claim 10, wherein providing the electrode comprises etching the top metal layer of the first layer to form the electrode.

12. The method of claim 10, wherein providing the second dielectric layer comprises:
providing a second laminate layer; and
removing the top and bottom metal layers from the second laminate.

13. The method of claim 9, wherein creating the compartment comprises:
creating a hole in the second dielectric; and
attaching the second dielectric to the first dielectric.

14. The method of claim 9, further comprising applying at least one alignment chemical coating to at least one surface of the apparatus in contact with the LC layer.

15. The method of claim 14, wherein the at least one alignment chemical coating is selected to, in the absence of an applied static electric field, align molecules of the LC layer in an orientation that is parallel to a plane of the electrode.

16. The method of claim 9, wherein the electrode comprises:
a plurality of sections, each of the plurality of sections being spaced apart from adjacent sections; and
links coupling each section to an adjacent section.

17. The method of claim 9, wherein at least two vias are created on one side of the apparatus, the at least two vias have a space therebetween; and wherein the method further comprises:
generating a bias line, the bias line being coupled to the electrode, wherein the bias line extends through the space between the vias.

18. The method of claim 10, wherein providing the second dielectric layer comprises:
providing a second laminate layer; and
removing the bottom metal layer from the second laminate;
wherein creating the compartment comprises creating a hole through the top metal layer of the second laminate; and wherein the method further comprises:
providing a third laminate layer; and
attaching the third laminate to the second laminate.

19. The method of claim 18, wherein metallizing the vias is performed before the filing of the compartment with a liquid crystal layer.

\* \* \* \* \*